United States Patent [19]
Pettit

[11] Patent Number: 5,842,317
[45] Date of Patent: Dec. 1, 1998

[54] CRACK ARRESTING STRUCTURE

[75] Inventor: Richard G. Pettit, Hampton, Va.

[73] Assignee: McDonnell Douglas Corporation, Long Beach, Calif.

[21] Appl. No.: 597,793

[22] Filed: Feb. 7, 1996

[51] Int. Cl.$^6$ ................................................ E02D 37/00
[52] U.S. Cl. ............................................................ 52/514
[58] Field of Search .................................. 52/541, 590.1, 52/590.2, 591.1, 514, 735.1, 777.1

[56] References Cited

U.S. PATENT DOCUMENTS

| | | |
|---|---|---|
| 3,110,086 | 11/1963 | Phillips . |
| 3,201,862 | 8/1965 | Gotoh . |
| 3,434,327 | 3/1969 | Speakman ................................. 72/377 |
| 3,487,518 | 1/1970 | Hopfeld . |
| 3,488,908 | 1/1970 | Jahn ................................. 52/591.4 X |
| 3,895,922 | 7/1975 | Phillips . |
| 3,935,688 | 2/1976 | Trojahn et al. ........................ 52/592.1 |
| 4,556,591 | 12/1985 | Bannik, Jr. . |
| 5,487,199 | 1/1996 | Nelson ................................. 52/731.1 X |

Primary Examiner—Christopher Kent
Assistant Examiner—Yvonne Horton-Richardson
Attorney, Agent, or Firm—Bell Seltzer Intellectual Property Law Group of Alston & Bird, LLP

[57] ABSTRACT

In a crack arresting structure the crack arresting feature is located in the transition from one thickness to another, or a region of increased thickness can be intentionally introduced for the purpose of inhibiting crack growth propagation. The crack arresting feature comprises two different structural configurations. These structures include a thickness transition region where a portion of the structure is plastically deformed at or immediately adjacent to the thickness transition region. Alternatively, an overhang is provided where an appendage to the thicker part extends back over the thinner part at a thickness transition region. A high strength fiber or wire, preferably of non-constant cross-section may be inserted into a gap underneath the overhang and held in place by crimping due to plastic deformation. Fiber or wire reinforced interface may be adhesively bonded into place prior to or in lieu of deformation or crimping. The plastic deformation is preferably accomplished by strip or localized coining of the part by feeding the part through rollers or by other means such as localized shot peening, or laser shock peening or other suitable methods which apply high local stresses and result in a local thickness reduction at or adjacent the thickness transition point (or on either or both sides thereof). This results in a local compressive residual stress region, which has been shown to impede or even turn crack growth.

5 Claims, 9 Drawing Sheets

CRACK ARRESTING STRUCTURE

BACKGROUND OF THE INVENTION

1. Field of the Invention

This invention relates to devices or structures designed to minimize or eliminate the development of cracks in panels, bays or other structures which tend to develop cracks. More specifically, this invention relates to the arresting of new cracks in stiffened panels or bays which are subject to cyclic loads and retaining the integrity thereof.

2. Related Art

Integral metal structures (such as structural panels or bays with integral stiffeners) have the potential to provide good structural efficiency at lower cost than conventional multi-piece aircraft construction. However, metallic structures tend to develop cracks in service, and experience has shown that once initiated, cracks can propagate fairly readily through integrally stiffened panels or bays subject to the cyclic loads. With conventional multi-piece construction, new cracks must initiate in each member, thereby inhibiting the spread of damage. In addition, the residual static strength of integrally stiffened panels or bays with cracks is also reduced because the crack can tear continuously in the skin and into the stiffener. Various systems with crack elimination have been developed with varying degrees of success. These are typified in U.S. Pat. Nos. 3,110,086 and 3,895,922 to PHILLIPS. The PHILLIPS devices are intended primarily to offset geometric stress concentrations around holes and cutouts with favorable residual stresses to render structures more resistant to fatigue crack initiation. More specifically, U.S. Pat. No. 3,110,086 illustrates the use of stress training as a repair method to slow or stop growth in a crack found in the part. HOWEVER, this appears to be only for temporary repair prior to part replacement. However, these patents address holes or cutouts and not the thickness discontinuity from one finite thickness to another or overhang acting in concert with stress coining. U.S. Pat. No. 3,201,862 to GOTOH has described essentially two kinds of processes for consolidating aluminum and steel components in which steel wires are imbedded between grooved layers of aluminum which metallurgically bonds together as rolling takes place to apply pressure through the thickness of the layers. This is accomplished by inserting the wires in a series of parallel slots and crimping occurs by rolling across the tops of the webs between slots crushing the webs into the slots and metallurgically bonding the interfaces together. Without such metallurgical bonding, the sandwich configuration would not consolidate the back to back faces of members of the structure and the members would not bond together. Unlike the instant invention, this requires high levels of plastic deformation and metallurgical bonding at the overhang is not desirable, since it would eliminate the overhang and permit crack growth through the overhang interface. U.S. Pat. No. 3,487,518 to HOPFELD discloses a mix of adhesive and fibrous reinforcement which is introduced to metallic structural recesses in the metallic structure member. The recesses in HOFFELD are closed by plastic deformation of the metal and the heating of the parts to cure the adhesive and consolidate the reinforcements. The instant invention provides a novel design feature at the interface between the skin and the integral stiffener or tear stopping members, which inhibits the growth of the crack between these members. Since integral structures have considerably lower part counts than conventional build-up structures, the main benefit resulting from such use is reduced manufacturing cost. Such cost savings can not be realized if the structural component has unacceptable damage tolerance as a result of such reduced manufacturing cost. The crack arrest feature of the instant invention as described herein inhibits fatigue crack propagation within the structure and improves the residual strength when damage is present.

BRIEF DESCRIPTION OF THE INVENTION

The crack arrest feature of the instant invention is to locate the crack arresting feature in the transition from one thickness to another, or a region of increased thickness can be intentionally introduced for the purpose of inhibiting crack growth propagation approximately normal to the stiffener or thickness transition line. The crack arresting feature itself comprises two different structural configurations. These structures include a thickness transition region where a portion of the structure is plastically deformed at or immediately adjacent to the thickness transition region. Alternatively, an overhang is provided where an appendage to the thicker part extends back over the thinner part at a thickness transition region. A high strength fiber or wire, preferably of non-constant cross-section may be inserted into a gap underneath the overhang and held in place by crimping due to plastic deformation. The fiber or wire reinforced interface may be adhesively bonded into place prior to or in lieu of deformation or crimping. The plastic deformation is preferably accomplished by strip or localized coining of the part by feeding the part through rollers or by other means such as localized shot peening, or laser shock peening or other suitable methods which apply high local stresses and result in a local thickness reduction at or adjacent the thickness transition point (or on either or both sides thereof). This results in a local compressive residual stress region, which has been shown to impede or even turn crack growth. Co-locating the strip or other coining with or adjacent to a thickness discontinuity provides powerful crack stopping potential because of the increased area at or adjacent to the residual stress region. If one side or both sides of the part is intended to be flush, it is useful to incorporate a small raised area on the flush side of the part which would be rolled flat or flush as a result of the strip coining operation. This presence of such raised areas also helps regulate the degree of cold work imposed. Alternatively, an overhang may be built into the part which amplifies the effect on the crack tip at the thickness discontinuity by placing more material close to the thickness transition line. For the crack to proceed into the stiffener, it must first go through the thickness of the overhang in a manner resembling a surface flaw rather than a more severe corner flaw. An overhang can be fairly easily extruded or machined into a part prior to coining. In either case, a high modulus or high-strength reinforcement located adjacent to the thickness transition adds additional stiffness to hold the crack closed, and to continue to maintain the load path even after the crack has passed the thickness transition point. The structure identified is potentially useful in aircraft structures and any other applications where low cost damage tolerant panel structures are required. The concept of coining with reinforcing ligaments (wire or fibre) as described constitutes a new and useful apparatus and method for arresting crack formation or turning crack progression and for maintaining strength in a part even after a crack is formed.

PREFERRED EMBODIMENT

Figure 1:
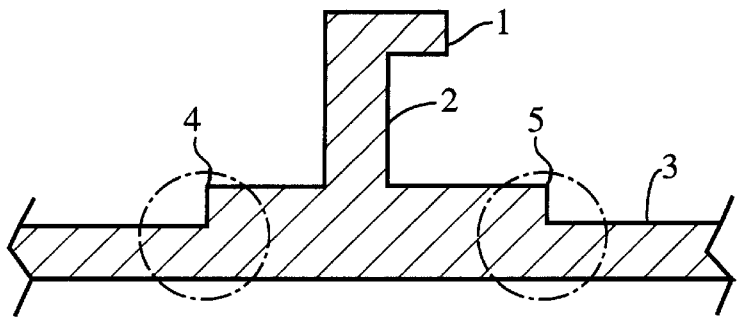
FIG. 1 is a cross-sectional view of an integral stiffener for an element protruding from a flat plate.
Figure 2:
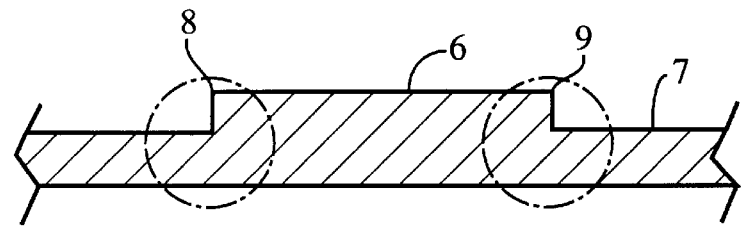
FIG. 2 is a reinforced pad showing the thickness transition region.
Figure 3:
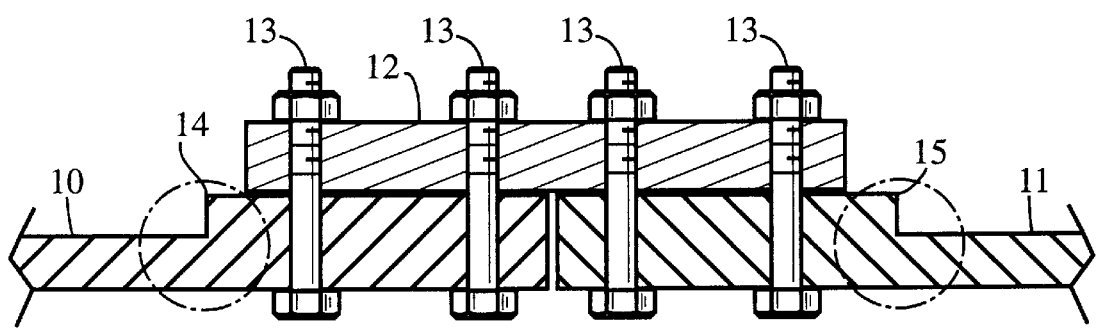
FIG. 3 are two joined members having the thickness transition build-up points for the joint.
Figure 4A:
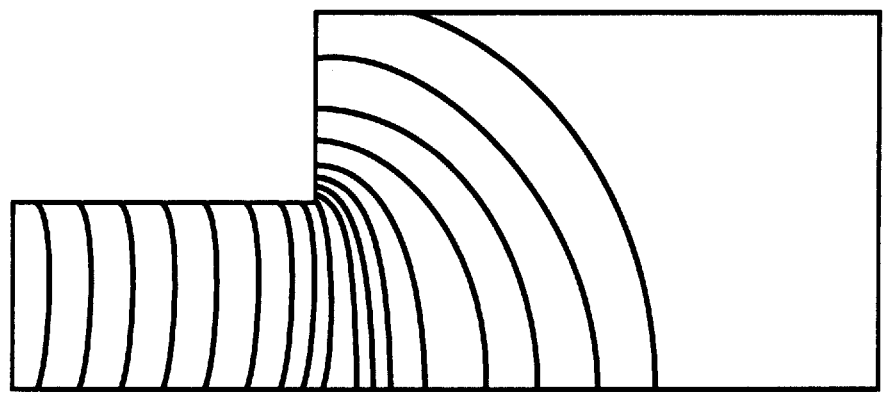
FIG. 4A is a schematic of the propagation of a crack through a thickness transition region.
Figure 4B:
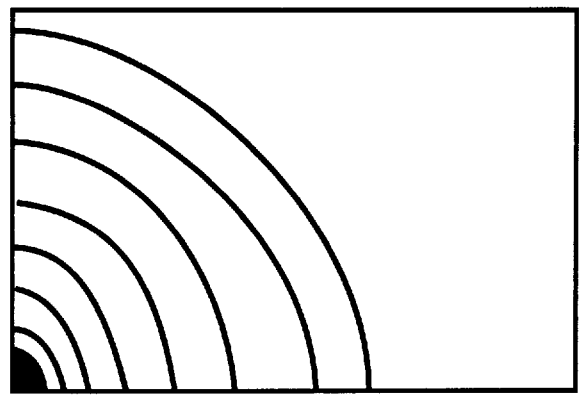
FIG. 4B is a schematic of the typical propagation of a crack due to a corner defect.
Figure 5A:
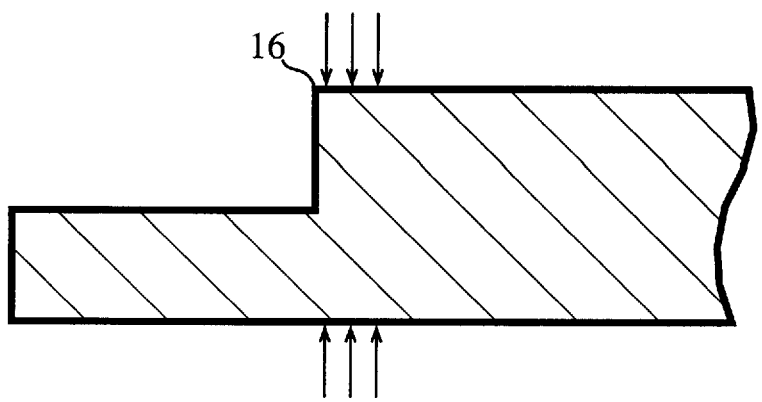
FIGS. 5A and 5B show the plastically deformed coined interface.
Figure 5B:
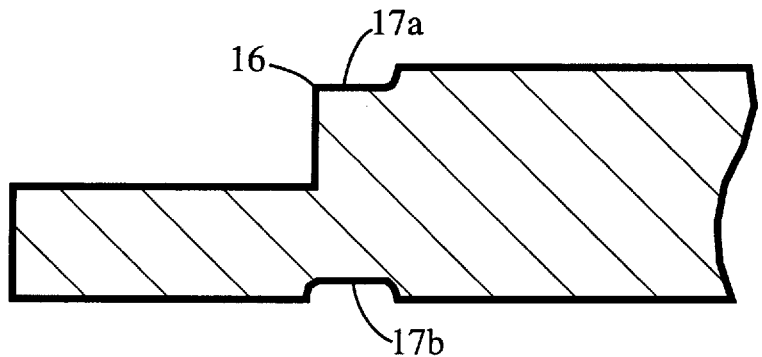
Figure 6A:
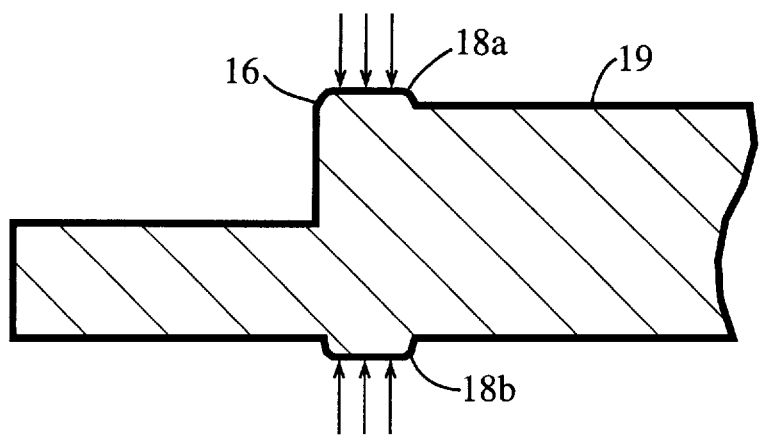
FIGS. 6A and 6B show the plastically deformed coined interface design for flush coining.
Figure 6B:
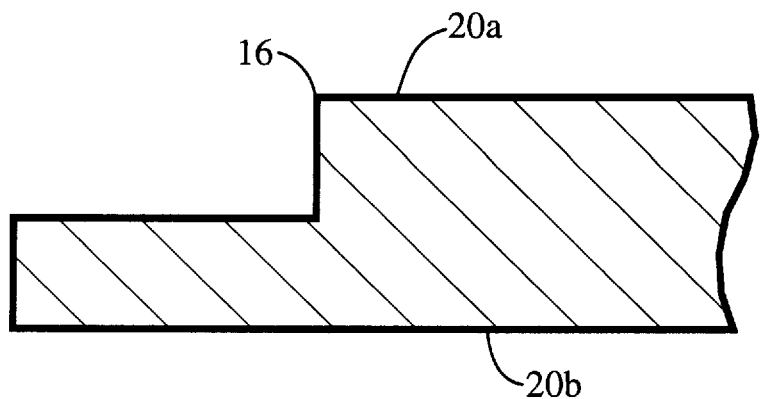
Figure 7:
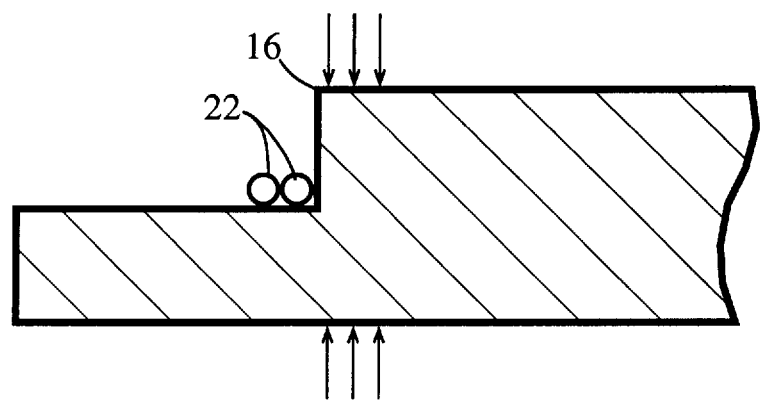
FIG. 7 shows the addition of fiber or wire reinforcement.
Figure 8A:
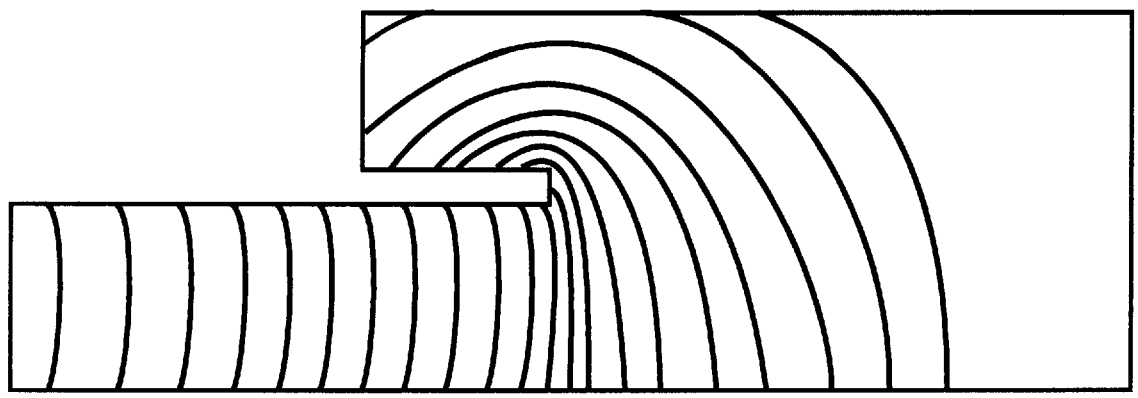
FIG. 8A is a schematic of the propagation of a crack through a thickness transition region with an overhang.
Figure 8B:
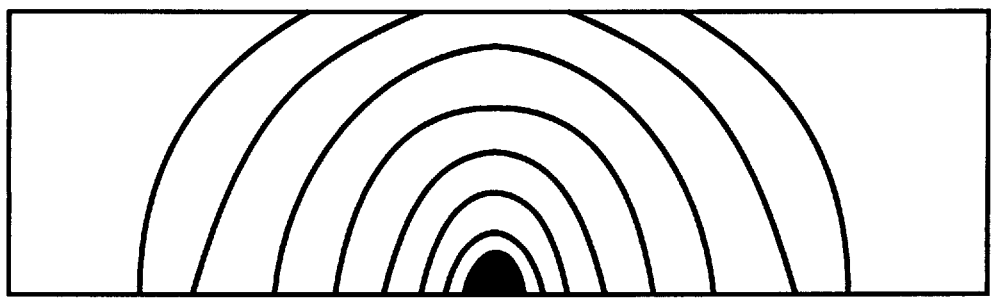
FIG. 8B is a schematic of the typical propagation of a crack due to a surface defect.
Figure 9A:
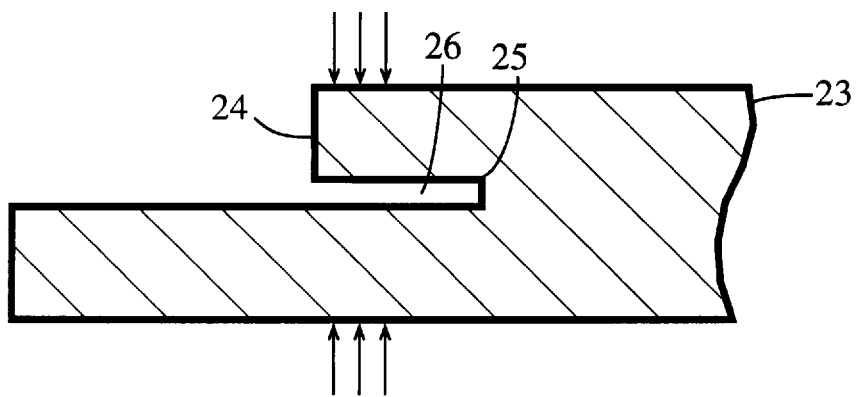
FIGS. 9A and 9B show the crimped overhang interface.
Figure 9B:
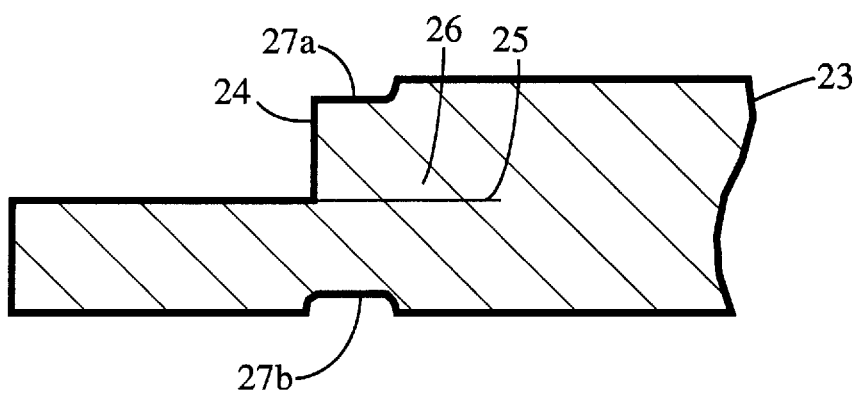
Figure 10A:
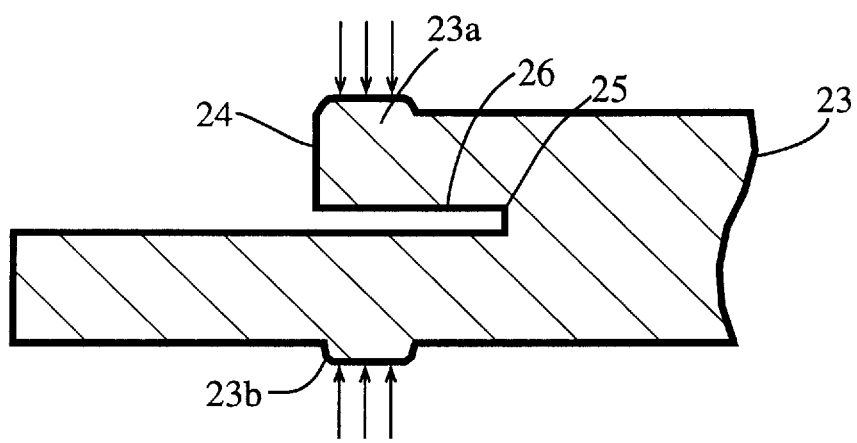
FIGS. 10A and 10B show the structure for the crimped overhang designed for flush coining.
Figure 10B:
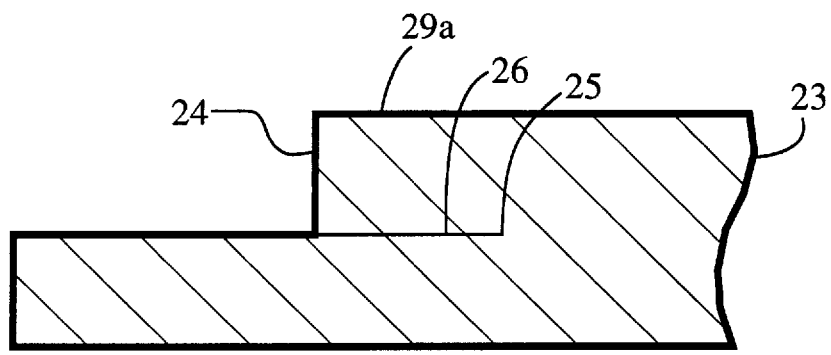
Figure 11A:
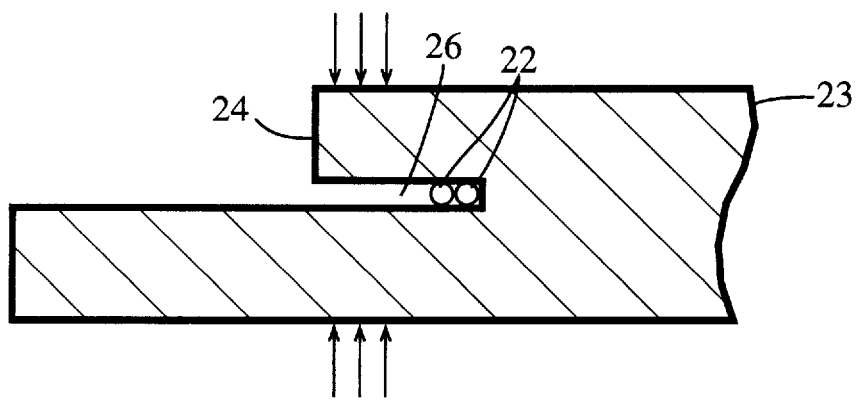
FIGS. 11A and 11B show the fiber or wire reinforced interface crimped into place.
Figure 11B:
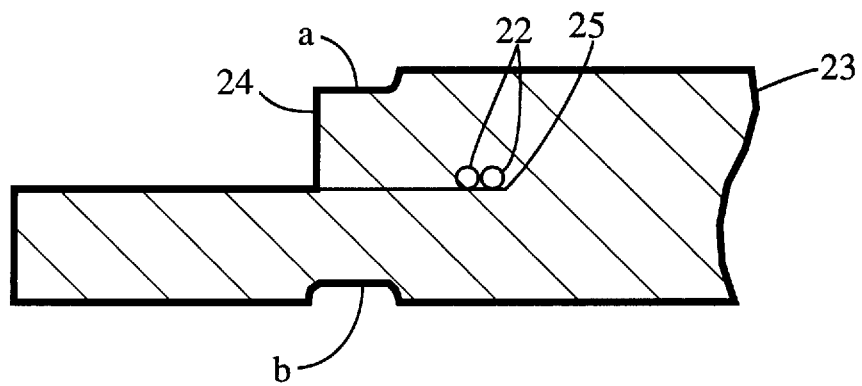
Figure 12:
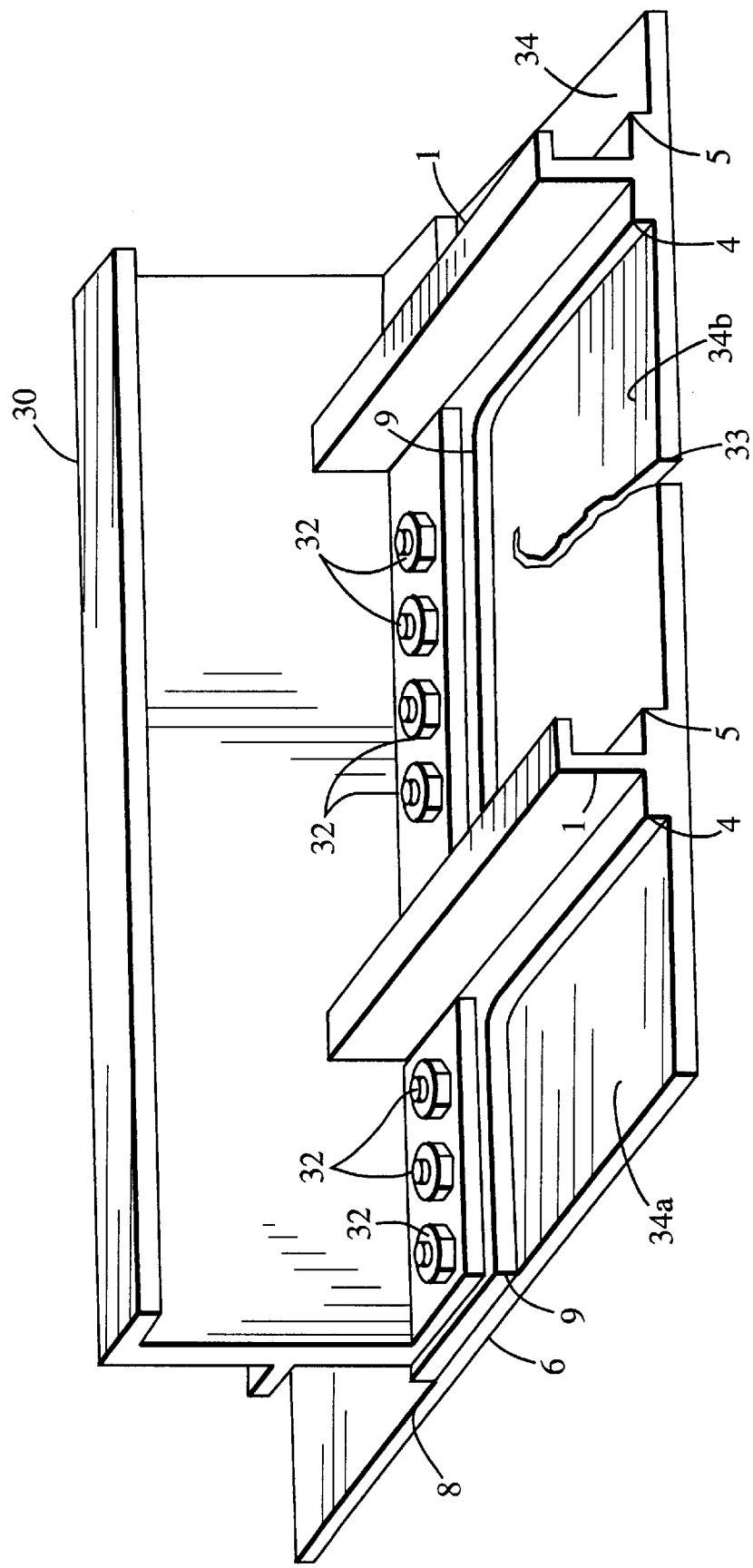
FIG. 12 is a three-dimensional view of a crack arrested by the instant invention incorporating various structures and illustrating a turned crack.

Referring to FIG. 1, an integral stiffener 1 is shown having a vertical member 2 and a generally horizontal member 3. The horizontal member 3 has two thickness transition regions, 4 and 5 formed by a first section and a larger second section, each identified by a circle which is not part of the structure itself, but is for only illustration purposes. FIG. 2 shows a reinforced pad 6 which is similar to the integral stiffener 1, except that it does not have a vertical member 2. That is, a horizontal section 7 with two thickness transition regions 8 and 9 also identified with a circle which is not part of the structure are shown on either side of the pad 6. In FIG. 3, horizontal members 10 and 11 are joined by a plate 12 and bolts 13, which extend through the plate 12 and the horizontal members 10 and 11 to fasten the joints. The thickness transition regions on horizontal plate 10 at 14 and on horizontal plate 11 at 15 are identified by circles which are not part of the structure. There may be other types of stiffeners, pads, or joints, or other structural members known to those skilled in the art which may be integrally stiffened and provided with the crack arresting features described herein and the invention is not limited to the particular structure shown. The essential element for the crack arresting feature is the creation of a thickness transition region, such as noted in FIG. 1 at 4 and 5 and FIG. 2 at 8 and 9 and FIG. 3 at 14 and 15. At the thickness transition point, crack growth is inhibited as shown in the schematic of FIG. 4A. As cyclical loads are placed on a part, the crack growth propagates through the part. However, on nearing the thickness transition region crack growth propagation slows. The crack proceeds in a manner which resembles the growth of a typical corner flaw as shown in FIG. 4B. The degree of the crack growth inhibiting capability may be increased by creating a reinforced region by coining to induce stresses and other structural changes as is discussed hereafter. It is at the transition point that the various modifications to the thickness transition region hereinafter described may be implemented. The simplest form of this is shown in FIGS. 5A and 5B where a thickness transition region 16 shown in FIG. 5A is subjected to plastic deformation due to coining as noted by the downward arrows applied to the part which is applied through rollers or other devices to impart high stresses through the thickness of the material. In reference to FIG. 5B, the applied pressure results in a local thickness reduction of the region at 17a and 17b. This is commonly called roll strip coining. Other methods such as shot peen coining utilizing the application of a blast of small spherical pellets or laser shock peening by vaporization of water at the surface of the part, as well as other methods known in the art may also be utilized and the invention is not to be considered as limited to the manner in which coining is accomplished. In FIG. 5B, strip coining has plastically deformed the part and FIG. 5B shows a slight notch or reduction of thickness of the part at point 17a on the top and at point 17b on the opposite side of the part. While the thickness transition region 16 itself provides a certain amount of crack impedance, the creation of the compressive residual stress region at 17a and 17b provides powerful crack stopping potential because of the combination of increased area and residual stress created by the coining. Such coining may be applied to either side of the thickness transition region or even to both sides thereof. With reference to FIG. 6A, the thickness transition point 16 has a slightly raised region 18a above the surface 19 of the part and a protruding region 18b on the opposite side of the part. The additional thickness is provided in order to achieve a flush surface 20a and 20b respectively after strip coining has being accomplished as shown in 6B and control the magnitude of the coining deformation. A flush surface can also be achieved by broadly supporting one side or the other of the part being coined to prevent localized deformation on the supported side by spreading the forces over a large region of the surface being supported and a protruding region would not be required. Other alternative methods described herein such as shot peening or laser shock minimize deformation of the side opposite the surface being coined. In FIG. 7, fiber or wire reinforcing members 22 may be added that create a high modulus or high strength reinforcement adjacent to the thickness transition point 16. The reinforcing members 22 will hold a propagating crack closed and maintain a load path even after the crack has passed the reinforcement point. The reinforcement members 22 may be held in place by an adhesive or other fastening methods. This allows the reinforcing members 22 to remain in position and maintain a load path even after the crack is passed the transition point 16. An alternate embodiment of the invention is disclosed in FIG. 9A which shows the part 23 having an overhang 24 at the thickness transition point 25, which has a slot 26 at the thickness transition point 25. Additionally, strip coining may be applied to a part 23 causing a deformation of the overhang 24 downward forcing the overhang 24 down thereby forcing the slot 26 closed and plastically deforming the part cross section as described above forming indentations 27a and 27b. The overhang 24 amplifies the effect of the thickness discontinuity with regard to the crack tip by placing more material close the thickness transition line at point 25. As shown by the schematic of crack growth illustrated in FIG. 8A, the overhang causes the crack growth to propagate in two directions. In effect, the crack must reverse direction, that is grow through the thickness of the overhang 24 in a manner resembling a surface flaw, as illustrated in FIG. 8B, rather than a more severe corner flaw. FIGS. 10A and 10B are designed in a similar fashion to the part in FIGS. 6A and 6B in that the part 23 is thicker at the overhang 24 and on closure of the slot 26 by coining causes the surface 23a and 23b to be made flush with the surface at points 29a and 29b. FIGS. 11A and 11B show the addition of the fiber or wire reinforcements 22 held in the slot 26 adjacent the transition point 25. In FIG. 11B when the part is coined, the overhang 24 closes the slot 26 over the fiber or wire reinforcing members 22, thereby maintaining a load path and additional stiffness. Prior to coining the fiber or wire reinforcing members 22 may be cemented into place or otherwise fastened to the part but such is not necessary as the fiber or wire reinforcement is held in place due to the crimping of the wire or fiber reinforcing member in the slot 26. FIG. 12 illustrates the integration of the various structures as used into a unit structure 30. A pair of the integral stiffeners 1 of FIG. 1 are mounted on transition regions 4 and 5, a pad 6 as shown in FIG. 2 having transition regions 8 and 9. The transition regions merge to form bays 34a, 34b and 34c. The pad 6 supports a structure bolted there to by bolts (not shown) and nuts 32 in a manner similar that of FIG. 3. The resulting structure forms a plurality of thickness transition regions about the structure 30 as shown in FIGS. 1, 2 & 3. In such a structure a crack 33 as shown in panel 34b may be stopped or turned as illustrated in FIG. 12 due to the formation of the crack arresting regions as previously described. This results in continued structural integrity of the structure 30 and isolation of the crack in the panel due to the surrounding crack arresting features.

Having thus described the invention what is claimed is:

1. A crack arresting structure comprising:
   a. a first section,
   b. a second section thicker than the first section integral with said first section forming a thickness transition region at the interface of said first and second sections, and
   c. a reinforced region adjacent said transition region, wherein said reinforced region includes a plastically deformed region on at least one side of said second section adjacent to said first section.

2. A crack arresting structure as described in claim 1 further comprising a reinforcing member attached to said structure adjacent said transition region.

3. A crack arresting structure as described in claim 1 wherein said reinforcing region is a plastically deformed region on both sides of said second section region.

4. A crack arresting structure comprising:
   a. a first section having an upper surface,
   b. a second section having an overhang which extends over at least a portion of said upper surface of said first section, wherein said second section is thicker than said first section and integral with said first section to thereby form a thickness transition region at the interface of said first and second sections, and
   c. a reinforced region adjacent said transition region, wherein said reinforced region includes a plastically deformed region on at least one side of said second section adjacent to said first section.

5. A crack arresting structure as described in claim 4 wherein the overhang has a lower surface which is positioned such that said lower surface is in contact with the upper surface of said first section.

* * * * *

UNITED STATES PATENT AND TRADEMARK OFFICE
CERTIFICATE OF CORRECTION

PATENT NO. : 5,842,317
DATED : December 1, 1998
INVENTOR(S) : Pettit

It is certified that error appears in the above-identified patent and that said Letters Patent is hereby corrected as shown below:

On the title page,

References Cited (Item [56]), U.S. PATENT DOCUMENTS, line 8, "Bannik, Jr." should read -- Bannink, Jr. --.

Column 6, claim 3, line 10, after "second section" delete "region".

Signed and Sealed this

Thirteenth Day of April, 1999

Attest:

Q. TODD DICKINSON

*Attesting Officer*   *Acting Commissioner of Patents and Trademarks*